Oct. 19, 1948. L. B. WINTON 2,451,460
MANOMETER
Filed Oct. 4, 1946 2 Sheets-Sheet 2
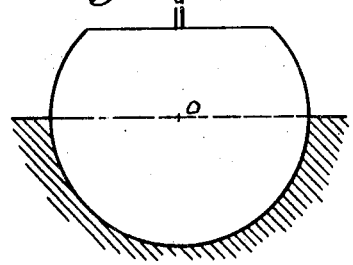
Fig. 2
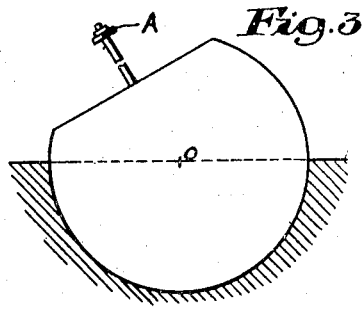
Fig. 3
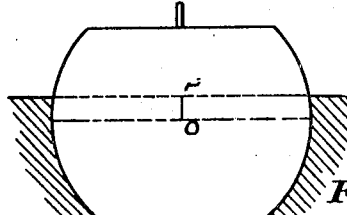
Fig. 4
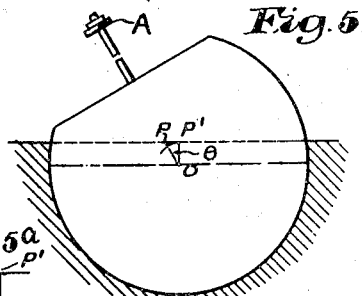
Fig. 5
Fig. 5a
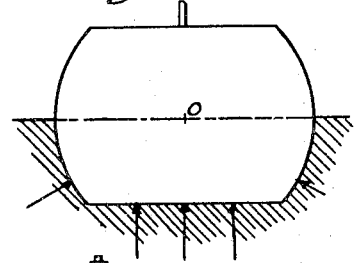
Fig. 6
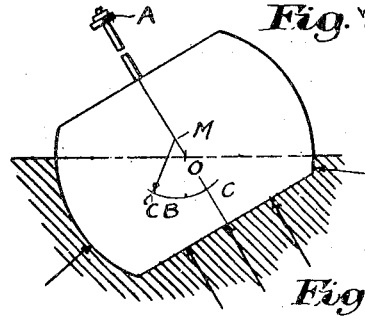
Fig. 7
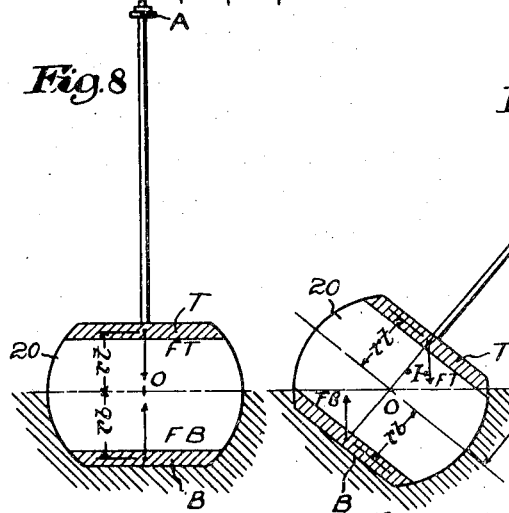
Fig. 8
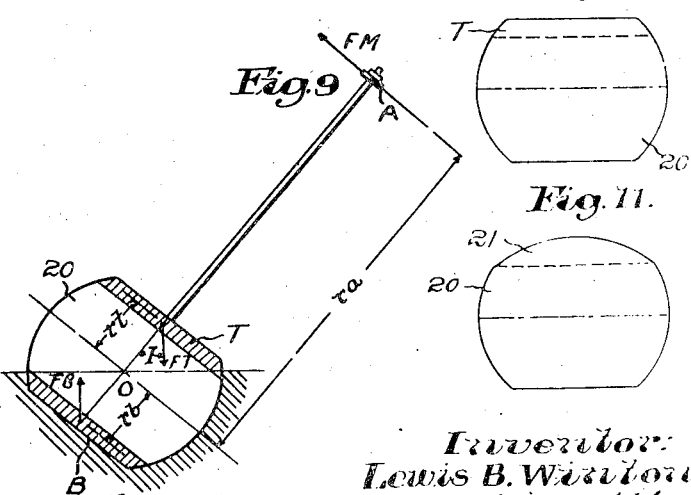
Fig. 9
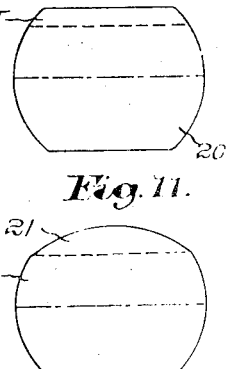
Fig. 10
Fig. 11
Inventor:
Lewis B. Winton
by Emery, Booth, Townsend, Miller & Neidner
Attys Patented Oct. 19, 1948

2,451,460

UNITED STATES PATENT OFFICE 2,451,460

MANOMETER

Lewis B. Winton, Greenwich, Conn., assignor to Jerguson Gage & Valve Company, Somerville, Mass., a corporation of Massachusetts Application October 4, 1946, Serial No. 701,151

5 Claims. (Cl. 73—403)

This invention relates to a manometer of the type in which the float is supported in a heavy liquid arranged as a U-tube and movement of the float governs an indicating mechanism. As in the case of my Patent 2,347,861, May 2, 1944, a primary object is to provide such an instrument in which the action will not be adversely affected by angular movements of the system of which it forms a part, as, for instance, when used on shipboard. From one point of view the present invention provides an alternative for the specific construction of my prior patent whereby equally satisfactory results may be obtained when limitations imposed by the form or nature of certain parts of the construction render it impracticable to utilize the precise structure shown in the patent. This will more fully appear from the following specification wherein I shall describe a particular embodiment of the present invention shown by way of example in the accompanying drawings, wherein—

Fig. 1a is an enlargement of a portion of Fig. 1;

Figs. 2 through 5 are diagrams illustrating a float with a body hemispherical at the bottom under various floating conditions;

Fig. 5a is an enlargement of the central portion of Fig. 5;

Figs. 6 and 7 are diagrams illustrating a float body of different form;

Figs. 8 and 9 are elevations of a float in different positions and serving to illustrate the analysis of its state of equilibrium;

Fig. 10 is a view of a float body similar to that of Fig. 1; and

Fig. 11 is a view of a modified form of float body.

Figure 1:
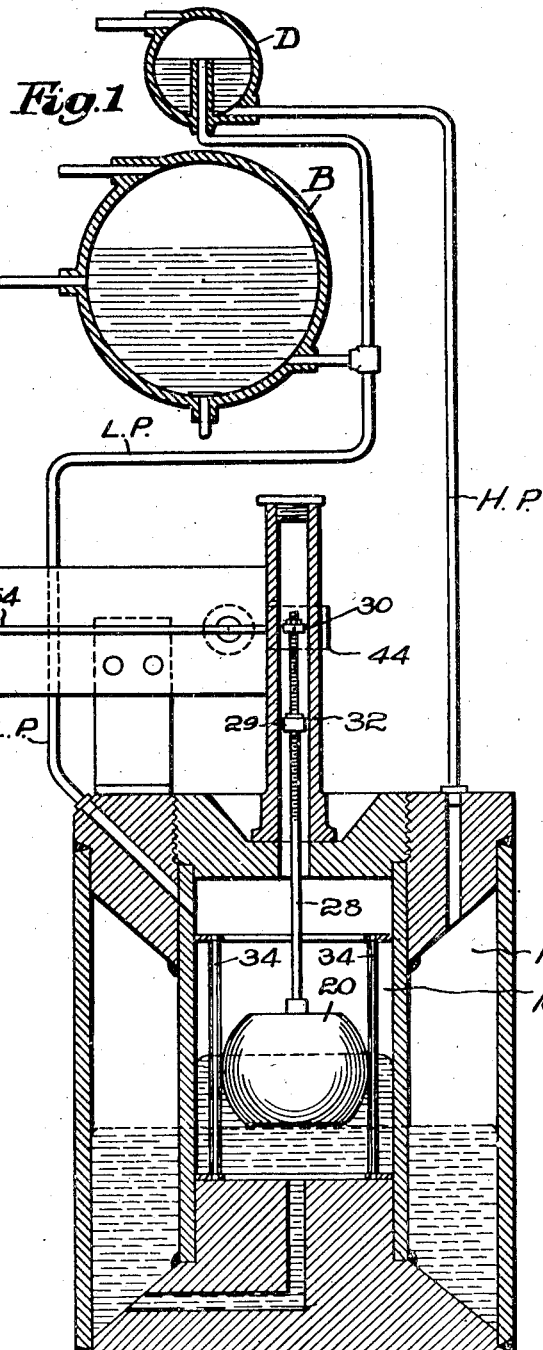
Fig. 1 is a figure chiefly in vertical section through the manometer with a diagrammatic illustration of its connection to a boiler, which may be taken to be a marine boiler, the manometer providing for indication of the water level in the boiler.

I shall first describe in a general way the construction of Fig. 1 as a preliminary to the discussion which follows and in so doing I shall utilize so far as practicable the reference numerals which apply to corresponding, but not necessarily identical, parts in my prior patent just referred to. In Fig. 1 I show an instrument embodying an outer chamber or well 12 and an inner chamber or well 16 concentric thereto, the two communicating at their bottoms and receiving a body of mercury, Hg, and forming essentially a U-tube. Pressures, the differential of which it is desired to measure, are admitted to the outer and inner chambers respectively and herein I have shown diagrammatically a high pressure or constant pressure connection H. P. and a low pressure or variable pressure connection L. P. leading respectively to a "datum chamber" D associated with the boiler B and to the water-containing spaces of that boiler. We may consider the part B in the drawings as the upper drum of a marine boiler. This arrangement is in accordance with the principles disclosed in the patent to Tripp 722,645 and in my aforesaid patent. In such an arrangement the boiler water will fill the pipes H. P. and L. P. in the upper portions of the chambers above the mercury therein but I have not attempted to show it except within the boiler drum B and the datum chamber D as I believe the figures are clearer without such a showing.

A float rests on the mercury in the inner chamber 16 and herein comprises a body portion 20 from which rises a stem 28 supporting an armature 30 which as the float rises and falls moves up and down within the non-magnetic tube 32 which forms an upward extension of the inner chamber 16 and by its cooperation with a magnet 44 exterior to the tube, the poles of the magnet being opposite the path of the armature, causes the pointer 54 to indicate on scale 56 the position of the float which when the mechanism is properly constructed, as hereinafter explained, will accurately reflect in all positions of inclination of the system the variations of level, measured along the axis of the manometer at the center line of the inner chamber which a body of mercury therein would assume under the sole influence of the pressures to be measured. A suitable magnetic transmission is described in detail in my patent above referred to and does not require to be described herein. The cooperation of the armature 30 which forms a portion of the float and the external magnetic means is an example of a mechanism, free from mechanical connection or engagement with the float, relative to which the float moves as the liquid level varies and which is constructed and arranged to be influenced by the variations in relative position to manifest the position of the float along the center line of the manometer and thereby the height of the liquid column in the inner chamber 16, the variations of which are proportionate to the variations of water level in the boiler B.

Herein the body 20 of the float is guided by rods 34 closely opposing the sides of the same and centering it within the chamber 16. In the example shown there is a substantial clearance around the body of the float and the inner wall of the chamber 16, representing a particular practical construction wherein a ball of 1½ inch diameter operates in a chamber 2 inches in diameter providing an annulus surrounding the former ¼ inch in width. The reasons for providing this particular construction are not material to an understanding of the present discussion. It is referred to here because it is one of the predetermined features of a particular design which effect the form and dimension of the float to be utilized. A variation would imply a variation in the float although the form of the latter would be determined in the manner to be explained.

For simplicity in the disclosure the monometer is shown of the concentric type wherein when the pressures are equalized the mercury stands at the same level in both chambers except that as indicated in Fig. 1 (without pretense of dimensional exactitude) the level in the inner chamber 16 is relatively depressed by the action of surface tension in the relatively narrow tubular chamber. We may also suppose the cross-sectional area of the outer chamber to be so large that a transfer of a volume of mercury sufficient to show a marked variation in the level in the inner chamber will not substantially affect the level of its outer chamber. This will simplify some of the theoretical discussions which will follow. In my prior patent above referred to I have shown what is known as a coaxial rather than a concentric manometer and therein the instrument operated always under a differential head. The principles which will be herein discussed are the same for both cases. Our present interest is in reflecting appropriately the position of the intersection of the plane of the mercury surface of the inner chamber with the center line of the chamber as the surface would be if influenced solely by the differential pressures disregarding changes due to the float and to the effect on the float of inclination of the system. If we accomplish this for a concentric manometer under zero differential head, we have equally solved the problem for any differential in either the concentric or coaxial type of instrument. Moreover, we need not concern ourselves with the fact that if the system is inclined the impressed head caused by a given boiler level is multiplied by the cosine of the angle of inclination and the response of the instrument is correspondingly affected. That subject matter is discussed in my Patents 2,334,463 and 2,347,860.

In the construction of my prior patent, as in the present, the preferred form of float did accurately reflect the intersection of the mercury surface with the center line of the inner chamber and its metacentric height was substantially zero. This was effected by providing a float having a partially spherical body which, if a complete sphere, would have sunk with its center below the surface of the mercury. The partly spherical body was formed by cutting away the upper portion of the sphere and providing a rod 28 and armature 30, the rod and armature having the same moment about the spherical center as the segment cut away so that the center of mass was at the spherical center but being of less mass than the segment so that the body of the float was submerged to an equatorial plane. The spherical center and the center of mass coincided and the buoyant pressures were exerted along radial lines toward those coincident centers. The float as a whole had a metacentric height of zero and was in neutral equilibrium. Such a construction is illustrated in the diagrams of Figs. 2 and 3. When the system is inclined, the float is inclined with it but the mercury remains horizontal and the parts take the position as shown in Fig. 3. The spherical body remains with its center at the surface and the distance O-A from the center to the armature remains constant. This implies that the body of the float has sufficient "freeboard" so that on ordinary inclinations encountered in practice the submerged portion of the body remains a hemisphere. That is, the body will not "roll its gunwale under," the small circle defining the upper base of the emersed spherical zone having a "north latitude" greater than the angle in question.

Such an arrangement implies a construction of some of the elements of the mechanical assemblage in a manner which it might be desirable to have otherwise in practice. This may be illustrated by an example. Obviously no sane designer will expect to make the ball of magnesium. Desirable materials for use in forming the float may be found in the class of so called stainless steels and will have a specific gravity roughly one-half that of the mercury. I emphasize the word "roughly." For convenience let us assume a sphere or complete ball having a specific gravity exactly one-half that of mercury. If the upper portion of the chamber above the mercury is filled with water as in the present instance, that part of the ball which is emersed from the mercury is buoyed up and the center of the ball would float above the mercury level. Clearly in the case of this particular ball we could not cut away a portion adjacent the north pole to cause it to sink to its center because it already floats too high. Again suppose that for certain reasons a comparatively long rod 28 is desirable. To maintain balance more material would have to be cut away from the ball and the total weight might then be too small to give proper depth of floating.

In the case of many designs also, such, for example, as that illustrated in Fig. 1, account must be taken of the effects of surface tension which in such an instrument as is herein illustrated is one of the forces which together with the ordinary displacement forces determine how a ball will float and the location of its metacenter. If a ball makes contact with the surface of the mercury along a great circle, we may assume that, on inclination, there will be no variation in the surface tension forces directly exerted on the ball along the periphery of the circle. On the contrary, if the surface is a small circle, as shown in Fig. 4, and the angle changes, the perimeter of the circle changes and the surface tension will vary. This statement assumes that the ball does not move along the axis of the manometer. In fact it would so move and the statement is intended as a suggestion concerning one of the forces which is a factor in such movement. Furthermore, if the chamber 16, as herein illustrated, defines a narrow annulus about the float, surface tension forces along the wall will show a marked variation in the level of the inner chamber although they might negligibly affect the level of the outer chamber of relatively great dimensions. It will be recalled that what we commonly refer to as the phenomenon of capillarity is strikingly illustrated by the depression of a mercury surface in a narrow tube dipping into a relatively large pool of mercury whereas the surface tension exerted on the surface of this large pool by the wall of its container is ignored. For cylindrical containers the depression varies inversely with the radius as set forth in Jurin's law. In general if the chamber 16 is circular the line of contact changes on inclination from a circle to an ellipse having a greater periphery and we would expect the surface tension forces to increase in absolute value to raise the level of the mercury and so to lift the float. The guide rods 34 intersect the surface closely adjacent the float body and surface tension effects give a complex contour to the surface of the mercury adjacent their locations and this contour changes on inclination in a manner defying simple description. It will be recalled also that if we are operating with water over the surface of the mercury, the water itself exhibits the phenomenon of surface tension in connection with the surfaces with which it makes contact, further complicating the situation.

The magnitude of the surface tension forces above referred to and their variation on inclination of the system depends upon the material of the surfaces, the size of the float body and of the chamber and on their relative sizes. It is quite easy to demonstrate the significant presence of these forces by comparing the floating depth of a given float in a construction such as that illustrated with its depth in an extended pool of mercury of effectively infinite size. Accurate measurement of these forces, however, is another matter. The parts of the manometer will ordinarily be of stainless steel or the like and the surface tension forces will be dependent upon the materials used. Any direct visual observation is thus impossible and indirect methods of directly measuring the liquid levels apart from observing their effect on the float present considerable difficulties. For the present I content myself with pointing out that the surface tension is significant and with indicating in a general way how we may reasonably expect it to affect the depth of submergence of the float borne by the mercury.

Now, referring to Figs. 4 and 5, we may consider what occurs on inclination of the system if the center of mass of the float is not at the mercury level. In Fig. 4 is seen a float with its center of mass O below the surface for the distance O—P, the float being in stable equilibrium. If inclined with the system to the position of Fig. 5, the mercury surface remaining horizontal, the vertical distance O—P' must be the same as O—P in Fig. 1. As more plainly seen in enlarged Fig. 5a, we have in effect depressed our float relative to the mercury level by a distance readily seen to be proportional to the ex-secant of the angle of inclination, θ. It would be more accurate to say that we have forced the float to move downwardly along the axis of the manometer. If the center of mass O were above the surface, inclination would tend to move the float downward.

If we have a body submerged in a liquid and withdraw it, the liquid level falls. If we push the body in deeper, the level rises. Therefore if our float is further emersed from one leg of the U-tube, the pressure remaining the same, the levels tend to equalize with transfer of liquid to the other leg. That is, a change in depth of immersion of the float due to inclination tends to produce a change in the inner mercury level, although the resultant change in the level of the outer well of large volume and large cross-sectional area may be negligible and this change is not due to a change in the pressure differential which it is the function of the instrument to indicate.

For the present we may postulate that in a given system it may be reasonable to think that the variation of surface tension forces will tend to raise the float on inclination of the system. If the center of mass of the float is immersed, we known that the float tends to fall on inclination. Therefore we may reasonably hope that the center of mass may be so positioned that these effects will effectively counterbalance each other for practical purposes throughout the range of inclination through which the system may move in practice.

We now approach the problem of effectively controlling the depth of immersion of the float body. Given a determined weight of superstructure, let us suppose that a float of the form diagrammed in Figs. 2 through 5 with partly spherical body of given diameter and density would float too high in a given construction. One way in which we can submerge the float more deeply is to reduce its under-water body so that its displacement will be less. That is, we may provide a body 20 flattened or otherwise cut away at the south pole as well as at the north pole, as shown in Fig. 1 and diagrammed in Figs. 6 and 7. In these figures the float body is shown as a segment with equal bases equatorially submerged because that is the simplest form for a diagram. From the figures it will be plain that so long as the upper base of the spherical segment remains emersed and the lower base immersed, that is, provided the body neither rolls its gunwale under nor its bilge out, the analysis of the action of surface tension forces and the analysis of the effect of the position of the center of mass relative to the mercury level holds good. Thus such a modification of form does not negative our belief that it might be possible effectively to oppose the two sets of forces.

We might suppose, however, that the resulting float would be either in stable or unstable equilibrium instead of in neutral equilibrium, which is the preferred construction as it was in my prior patent.

As indicated by the arrows, the displacement forces on the spherically curved lateral surfaces of the under-body of the float will be directed toward the spherical center as in the case of a completely hemispherical under-body. The forces acting on the bottom of the float normal thereto will change their direction as the system is inclined and the pressures on unit areas will vary in accordance with the depth of submergence.

Considering displacement forces alone, the upward component of the displacement forces exerted by the mercury would be considered as acting through a point CB corresponding in position to the center of mass of the immersed portion of the under-body. As the angle of inclination varies, this point will describe a curve C, shown diagrammatically in the figure without pretense to accuracy in form or dimension. The center of curvature M of this curve (shown in the diagram for clearness as widely spaced from the center of mass O) is the metacenter, the position of which relatively to the center of mass determines the stability or instability of the floating body. In the case of a ship we are concerned merely with the centers of buoyancy, so called, of the under-water body, any effect of surface tension being negligible, but in the present instance the surface tension exerts a force having a vertical component and is a factor in determining the metacenter. Also as the system inclines, unless the center of rotation is at the mercury surface the volume of the portion moving out from mercury into water is not the same as the portion moving from water into mercury. The buoying action of both media must be considered. Now, without attempting in any way to estimate the numerical magnitude of these forces for a given case, we may agree that it would not be impossible that the float could be so proportioned that the metacenter would so nearly coincide with the center of mass of the float that for the range of movement contemplated they would be substantially coincident and that the float would be substantially in neutral equilibrium in that no objectionable side pressure would be developed at the location of the armature 30. Therefore, when as in the present case we have a body floating in a liquid, the body and the liquid surface being subject to relative angular movements through a given range, and we observe that the body under the action of the various forces which may affect its flotation develops no rotary reaction in a vertical plane on inclination alone of the system, we may assert that its metacentric height is zero.

As a matter of fact, within such limits as are consistent with intelligent design we may so proportion the float when the other elements of the mechanical construction are predetermined that it not only reflects accurately the movement of the center point of the mercury column throughout the range of inclination but also, and preferably, is in neutral equilibrium. Particularly on account of the variable conditions which the design of the mechanism may impose it is not practical to give instruction as to the dimensions and mass of the float in terms of millimeters and grams. To do so would merely permit the mechanic to duplicate a given construction without instructing him on how to proceed if some details of the constants were different. However, those units are not the only measuring facilities which we have at our command and the following description is in such full, clear, concise and exact terms as will enable one skilled in the art to make the instrument by following the procedure set forth in order to determine the form of the float. When once so determined, the resultant pattern may be duplicated for production purposes without repeating the procedure.

We completely construct the mechanism including the two wells 12 and 16, the float body 20, the rod 38 and armature 30 of the dimensions and materials which are actually to be used except as to the form of the float body and as to that the diameter and density are predetermined. Thus to use a practical example, the float body may be made from a commercial stainless steel ball 1½ inches in diameter. Such balls in a commercially purchased lot weighed on an average 221.03 grams in air and varied in a lot of twelve taken at random on account of variations both in diameter and in density between .17 gram over the average and .13 gram under the average, amounts which may be safely disregarded. By computation based on the theoretical displacement effects of water and mercury, this ball is cut away at the poles so that in the resultant float the center will sink almost to the surface of the mercury, conveniently floating a little high. The reductions may be effected in various combinations provided we maintain an adequate freeboard and an adequate draft for the body making allowance for such subtractions as may thereafter be needed as hereinafter explained. A range of 35° inclination to either side of vertical may be considered a suitable range for the instrument (if our ship is on her beam ends, we have other things to think about rather than the instrument reading) and conservative design would call for at least 40° of latitude at either side of the equator in the finished float. The annexed drawings generally show more. It seems desirable to hold the amount cut away at the south pole to a minimum in so far as that may be practical.

The rough float having this cut away body is placed in the chamber in mercury and under water under equal pressures. It will no doubt float too high. The float body may then be loaded with suitable weights, conveniently in the form of thin washers encircling the stem, and tested under inclination until it is so loaded that there is no variation in the vertical position of the float due to such inclination. During and probably at the end of this operation the float will be out of balance and a side pressure will develop on the armature but it may be freed to permit readings to be effected by tapping the instrument as one taps a barometer. We then have the problem of reducing the displacement of our float by an amount equal to the weight of our added weights weighed in water. If this is effected by removing material at the bottom of the float, the volume removed is much smaller than that of the weights as the buoyancy is reduced by the volume removed multiplied by the density of mercury less the density of the same volume of water which buoyed up the original weights.

Our float now moves accurately to reflect the position of the mercury column at the middle point of the inner well 16 and we deduce that the position of the center of mass relative to the mercury surface is such as to compensate on inclination for the variations in surface tension. In practice this compensation appears to be in practical effect equally effective throughout the desired range of inclination.

It is highly probable that the float as so constructed will not be in balance but will float either in stable or unstable equilibrium producing a side thrust at the armature on inclination. An additional problem is to correct this without affecting the accuracy of response. Referring now to Fig. 8, I there show a spherical float flattened at both poles with two shaded segments or discs T and B at the top and bottom, the weight of which may be considered as centered at their respective centers of mass which are on their respective radii from the center O of the sphere. Consider the float as rotating about the spherical center O in the manner of a ball and socket joint with the float as the ball and the mercury as the socket. The forces on these discs are, respectively:

$F_T$ = weight in air minus buoyancy of water.
$F_B$ = buoyancy of mercury minus weight in air.

If the float is floating at the desired depth, we are free to either add simultaneously or subtract simultaneously T and B if they are proportioned so that $F_T$ is equal to $F_B$ without changing the position of the center of mass of the float body relative to the mercury surface. Therefore we may, if we desire, without losing accuracy change the latitudes of the upper and lower spherical segments which have been determined in the manner already described.

The float will probably be out of balance. Referring to Fig. 8, suppose we find that in this position there is a righting moment which produces a force FM which we will measure. We can produce an equal and opposite moment without changing the floating depth by adding simultaneously T and B proportioned so that FT and FB are equal. The equation for equilibrium taking moments around O will be:

$$FT(rt \cos I) + FB(rb \cos I) = FM(ra)$$
as
$$FT = FB$$
$$FT(rt + rb) \cos I = FM (ra)$$

Had we found an overturning movement we would have subtracted simultaneously volumes T and B.

It is interesting to note that when simultaneously adding or subtracting these volumes T and B their effectiveness cancels in respect to floating depth but adds in respect to balancing movement.

Having produced a pattern in this manner, it may be duplicated to dimension.

I have described the sphere as if cut away along parallels of latitude. To reduce the mass and volume in this manner is convenient in practice but flat surfaces are not required provided the volumes at the bases of the central spherical segment are symmetrical about the axis. For instance, to form the top of the float so that it would shed any mercury which might be lodged thereon, we might substitute for a segment of two bases such as the segment T in Fig. 10 a shallow spherical segment 21 (Fig. 11) having but one base, that base of the same size as the lower base of segment T, the segment having a radius of curvature different from that of the main portion of the body of the float and having the same volume and the same moment about the center O as the disc T. The general form of such a float body 20a is seen in Fig. 10.

In Fig. 1 I have shown the stem 28 as threaded and a small balance weight 29 threaded thereon and secured in position by a lock nut 31. Such an arrangement will permit an adjustment of the equilibrium of the float without altering its depth of immersion.

I am aware that the invention may be embodied in other specific forms without departing from the spirit or essential attributes thereof, and the present embodiment should therefore be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. An indicating mechanism for use where subject to bodily angular displacement and of the type which includes a manometer of the hydrostatic type having a chamber containing a manometric liquid on which rests a float and means external to the chamber free from mechanical connection or engagement with the float and relative to which the float moves as the liquid level varies, said means being constructed and arranged to be influenced by the variations in relative position to manifest the vertical position of the float and thereby the height of the liquid column, which mechanism is characterized by the fact that said float comprises a body in the form of a sphere cut away at top and bottom, the intermediate spherical segment being of such altitude that its upper and lower bases remain respectively emersed and immersed throughout the range of inclination, the metacentric height of the float being substantially zero, which is manifested by the fact that the float develops no rotary reaction in a vertical plane on inclination alone of the system.

2. An indicating mechanism for use where subject to bodily angular displacement and of the type which includes a manometer of the hydrostatic type having a chamber containing a manometric liquid on which rests a float and means external to the chamber free from mechanical connection or engagement with the float and relative to which the float moves as the liquid level varies, said means being constructed and arranged to be influenced by the variations in relative position to manifest the vertical position of the float and thereby the height of the liquid column, which mechanism is characterized by the fact that said float comprises a body in the form of a sphere cut away at top and bottom, from which rises a superstructure having adjacent its upper end a portion opposite said means for influencing the same, the intermediate spherical segment being of such altitude that its upper and lower bases remain respectively emersed and immersed throughout the range of inclination, the metacentric height of the float being substantially zero, which is manifested by the fact that the float develops no rotary reaction in a vertical plane on inclination alone of the system.

3. An indicating mechanism for use where subject to bodily angular displacement and of the type which includes a manometer of the hydrostatic type having a chamber containing a manometric liquid on which rests a float and means external to the chamber free from mechanical connection or engagement with the float and relative to which the float moves as the liquid level varies, said means being constructed and arranged to be influenced by the variations in relative position to manifest the vertical position of the float and thereby the height of the liquid column, which mechanism is characterized by the fact that the float-receiving chamber and float are so proportioned and spacially correlated that a substantial variation of surface tension forces acting on the float is manifested when the system is inclined and that the float comprises a body in the form of a sphere cut away at top and bottom, the intermediate spherical segment being of such altitude that its upper and lower bases remain respectively emersed and immersed throughout the range of inclination, the body being immersed to such depth that the spherical center is displaced from the liquid level in the chamber to provide on inclination a displacing force on the float substantially neutralizing the force developed by change of surface tension as manifested by the fact that the float does not move along the axis of the manometer on inclination alone of the system.

4. An indicating mechanism for use where subject to bodily angular displacement and of the type which includes a manometer of the hydrostatic type having a chamber containing a manometric liquid on which rests a float and means external to the chamber free from mechanical connection or engagement with the float and relative to which the float moves as the liquid level varies, said means being constructed and arranged to be influenced by the variations in relative position to manifest the vertical position of the float and thereby the height of the liquid column, which mechanism is characterized by the fact that the float-receiving chamber and float are so proportioned and spacially correlated that a substantial variation of surface tension forces acting on the float is manifested when the system is inclined and that the float comprises a body in the form of a sphere cut away at top and bottom, the intermediate spherical segment being of such altitude that its upper and lower bases remain respectively emersed and immersed throughout the range of inclination, the body being immersed to such depth that the spherical center is displaced from the liquid level in the chamber to provide on inclination a displacing force on the float substantially neutralizing the force developed by change of surface tension as manifested by the fact that the float does not move along the axis of the manometer on inclination alone of the system, and the mass of the float being so distributed throughout its volume that the float is in substantial neutral equilibrium in all angular positions as manifested by the fact that the float develops no rotary reaction in a vertical plane.

5. An indicating mechanism for use where subject to bodily angular displacement and of the type which includes a manometer of the hydrostatic type having a chamber containing a manometric liquid on which rests a float and means external to the chamber free from mechanical connection or engagement with the float and relative to which the float moves as the liquid level varies, said means being constructed and arranged to be influenced by the variations in relative position to manifest the vertical position of the float and thereby the height of the liquid column, which mechanism is characterized by the fact that said float comprises a body in the form of a sphere cut away at top and bottom, from which rises a superstructure having adjacent its upper end a portion opposite said means for influencing the same, said superstructure comprising an adjustably movable counterbalancing mass, the intermediate spherical segment being of such altitude that its upper and lower bases remain respectively emersed and immersed throughout the range of inclination, the metacentric height of the float being substantially zero, which is manifested by the fact that the float develops no rotary reaction in a vertical plane on inclination alone of the system.

LEWIS B. WINTON.

REFERENCES CITED

The following references are of record in the file of this patent:

UNITED STATES PATENTS

| Number | Name | Date |
|---|---|---|
| 2,347,861 | Winton | May 2, 1944 |

FOREIGN PATENTS

| Number | Country | Date |
|---|---|---|
| 160,017 | Germany | Apr. 27, 1905 |